United States Patent
Dierkes

(10) Patent No.: US 8,322,540 B2
(45) Date of Patent: Dec. 4, 2012

(54) FILTER ELEMENT FOR WATER LOADED WITH SOLID PARTICLES AND DISSOLVED TOXIC SUBSTANCES AND PURIFICATION SYSTEM EQUIPPED WITH SAID FILTER ELEMENT

(75) Inventor: Carsten Dierkes, Munster (DE)

(73) Assignee: Royal Environmental Systems, Inc., Stacy, MN (US)

( * ) Notice: Subject to any disclaimer, the term of this patent is extended or adjusted under 35 U.S.C. 154(b) by 1781 days.

(21) Appl. No.: 11/043,379

(22) Filed: Jan. 26, 2005

(65) Prior Publication Data

US 2006/0163147 A1    Jul. 27, 2006

(51) Int. Cl.
*B01D 35/00*    (2006.01)
(52) U.S. Cl. .................. 210/510.1; 210/299; 210/303
(58) Field of Classification Search .................. 210/903, 210/631, 630, 620, 303, 299, 510.1, 446, 210/435, 290, 266, 207, 206, 210, 170.08, 210/170.03
See application file for complete search history.

(56) References Cited

U.S. PATENT DOCUMENTS

| | | | |
|---|---|---|---|
| 1,117,601 A * | 11/1914 | Porter | 210/503 |
| 1,236,645 A * | 8/1917 | Allen | 210/200 |
| 1,763,773 A * | 6/1930 | Godbe | 210/791 |
| 1,784,132 A * | 12/1930 | Cabrera | 210/150 |
| 1,910,758 A * | 5/1933 | Dundore | 210/506 |
| 3,199,996 A * | 8/1965 | Bailly | 106/677 |
| 3,343,680 A * | 9/1967 | Rice et al. | 210/263 |
| 3,865,725 A * | 2/1975 | Condolios et al. | 210/787 |
| 3,898,160 A * | 8/1975 | Finley | 210/696 |
| 4,211,655 A * | 7/1980 | Jordan | 210/108 |
| 4,451,366 A | 5/1984 | Smisson | |
| 4,747,962 A | 5/1988 | Smisson | |
| 4,765,892 A | 8/1988 | Hulbert et al. | |
| 4,816,156 A * | 3/1989 | Brombach et al. | 210/512.1 |
| 4,889,166 A | 12/1989 | Lakatos | |
| 4,903,899 A | 2/1990 | Lamb | |
| 4,925,556 A * | 5/1990 | Gaudin et al. | 210/293 |
| 4,983,294 A | 1/1991 | Lamb | |

(Continued)

FOREIGN PATENT DOCUMENTS

DE    1403186    *   7/1971

(Continued)

OTHER PUBLICATIONS

U.S. Standard Sieve Series, available at http://www.wirecloth.com/howto/convert/ussieve.html on Apr. 25, 2008.*

(Continued)

*Primary Examiner* — Nam Nguyen
*Assistant Examiner* — Denise R Anderson
(74) *Attorney, Agent, or Firm* — Nikolai & Mersereau, P.A.; Thomas J. Nikolai

(57) ABSTRACT

The invention relates to a filter element consisting of a molded body of porous concrete, which element is arranged in the water stream of a purification system. In particular, the filter element (10) is a molded pervious concrete layer arranged as a partition between a lower compartment (9) and an upper compartment (11) of a treatment chamber (8), wherein the water inlet (12) opens into the lower compartment (9) and a water outlet (17) issues from the upper compartment (11). The pervious concrete filter layer may contain one or more additives to enhance adsorption of pollutants, such as heavy metal ions, phosphorous, hydrocarbons or other target soluble pollutants.

4 Claims, 1 Drawing Sheet

U.S. PATENT DOCUMENTS

| | | | |
|---|---|---|---|
| 4,983,295 A | 1/1991 | Lamb et al. | |
| 4,985,148 A | 1/1991 | Monteith | |
| 5,116,516 A | 5/1992 | Smisson | |
| 5,337,789 A | 8/1994 | Cook | |
| 5,480,559 A | 1/1996 | Smisson | |
| 5,498,331 A | 3/1996 | Monteith | |
| 5,520,804 A * | 5/1996 | Ward | 210/189 |
| 5,640,988 A | 6/1997 | Brereton | |
| 5,698,099 A | 12/1997 | Fagan et al. | |
| 5,725,760 A | 3/1998 | Monteith | |
| 5,753,115 A | 5/1998 | Monteith | |
| 5,849,181 A | 12/1998 | Monteith | |
| 6,068,765 A | 5/2000 | Monteith | |
| 6,187,178 B1 | 2/2001 | Lecornu et al. | |
| 6,200,469 B1 * | 3/2001 | Wallace | 210/150 |
| 6,371,690 B1 | 4/2002 | Monteith | |
| 6,374,858 B1 | 4/2002 | Hides et al. | |
| 6,730,222 B1 | 5/2004 | Andoh et al. | |
| 6,730,225 B1 | 5/2004 | Duke et al. | |
| 6,953,524 B2 | 10/2005 | Woodbridge et al. | |
| 7,005,060 B2 | 2/2006 | Pitt et al. | |
| 7,094,337 B2 | 8/2006 | Williams et al. | |
| 2001/0047965 A1 * | 12/2001 | Ghalib | 210/753 |
| 2002/0008064 A1 * | 1/2002 | Hamamoto et al. | 210/435 |
| 2005/0205146 A1 | 9/2005 | Andoh et al. | |
| 2006/0043010 A1 | 3/2006 | Faram et al. | |

FOREIGN PATENT DOCUMENTS

| | | |
|---|---|---|
| DE | 10231241 A1 * | 1/2004 |

OTHER PUBLICATIONS

Hawley's Condensed Chemical Dictionary, 14th ed., pub. John Wiley & Sons, Inc., 2002—heading is "cement, Portland.".*

Water Encyclopedia, ed. Jay Lehr et al., pub. John Wiley & Sons, Inc., vol. 1, pp. 192-196, Section 1.2.27 entitled "Disinfectants" by Raghuraman Venkatapathy et al., 2005. Water Encyclopedia, vol. 2, pp. 362-366, Section 2.5.87 entitled "Sorptive Filtration" by K.A. Matis and N.K. Lazarides, 2005.*

Dierkes, Carsten et al., "Sustainable Urban Drainage and Pollutant Source Control by Infiltration," Stormwater Industry Association 2002 Regional Conference, Orange, NSW, Exploding the Myths—Stormwater Driving the Water Cycle Balance, Apr. 23-23, 2002.*

* cited by examiner

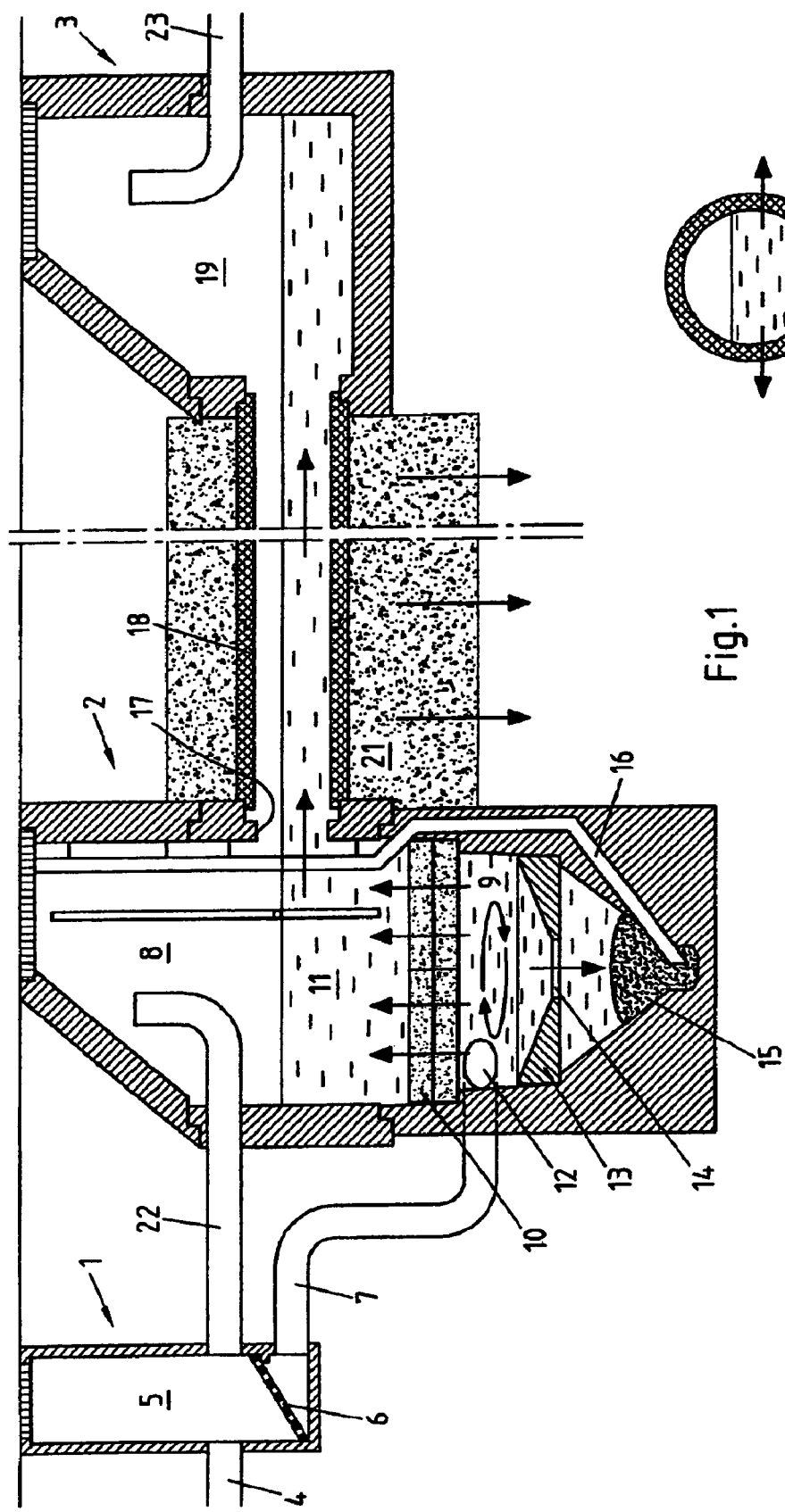

FILTER ELEMENT FOR WATER LOADED WITH SOLID PARTICLES AND DISSOLVED TOXIC SUBSTANCES AND PURIFICATION SYSTEM EQUIPPED WITH SAID FILTER ELEMENT

BACKGROUND OF THE INVENTION

I. Field of the Invention

This invention relates generally to methods for removing pollutants from stormwater runoff, and more particularly to the design of an underground containment vessel designed to remove solids and targeted dissolved chemical elements that may be present in stormwater runoff.

II. Discussion of the Prior Art

Stormwater runoff from building roofs, parking lots, roadways, etc. picks up contaminants that can be harmful to the environment if allowed to pass, untreated, into rivers, streams, aquifers and the like. The EPA has data suggesting that polluted stormwater runoff is a leading cause of impairment to the nearly 40% of surveyed U.S. water bodies which do not meet water quality standards. Over land or via storm sewer systems, polluted runoff is discharged, often untreated, directly into local water bodies. The pollutants may include solids including sand, gravel, grass, leaves, and the like. It is also known that stormwater runoff can pick up various nutrients, including phosphorous, potassium, and nitrates from lawn and agricultural fertilizers and heavy metals, including cadmium, zinc, copper, lead, nickel, chromium from metal building roofs, gutters, downspouts and the like. Stormwater runoff from roadways and parking lots include polysiclic, aromatic hydrocarbons from oils and motor fuels. Of course, significant concentrations of solids and dissolved pollutants should not be discharged to ground water or open watercourses. Also, the introduction of this water into the city sewer system is not desired, since a corresponding capacity must be reserved in this sewer treatment facility for this purpose. The invention is concerned with the problem of purifying such water, especially heavy-metal ion containing wastewater from metal roofs, such as copper roofs, prior to its seeping into the ground or prior to its introduction into a body of water.

It is accordingly a principle object of the present invention to provide a structurally simple filter element for water loaded with solid particles and dissolved toxic substances as well as a purification system suitable for said filter, which system effectively removes the solid particles and particulate toxic substances from the water without great expense.

SUMMARY OF THE INVENTION

This object is achieved with a filter element that consists of a molded body or porous or pervious concrete and is arranged in the purification system as a body through which the water stream flows. Preferably, the molded body of concrete has a pore ratio of 15% to 35% volume. The molded body preferably consists of a single grain-size concrete with a filter grain-size of 0.25 to 4.0 mm. The concrete consists preferably at 85% to 89% by volume, of natural or synthetic aggregates, preferably of quartz, and 11% to 15% by volume of binder. It is also advantageous when the aggregate displays a substantially round grain shape. Broken material should be avoided. As cement, preferably a blast furnace cement, for example CEM III/A accordingly to DIN 1164-1, may be used. However, it is to be understood that a suitable organic resin may be used as the binding agent. Especially suitable cements contain 35% to 64% by weight portland cement klinker, 36% to 65% by weight granulated blast-furnace slag, as well as 0% to 5% by weight of conventional secondary components. To enhance the adsorption action of the filter, 1%-15% by weight, especially 3% to 7% by weight, relative to the binder content, of additives such as iron oxides and/or iron hydroxides ($Fe(OH)_2$) can be further added to the concrete. Suitable additives are, in particular Fe(III) oxides such as goethite, $Fe_2O_{3-x}H_2O$ and/or hematite ($Fe_2O_3$). It is further advantageous for the adsorption characteristics when the concrete contains, in addition, up to approximately 10% by weight aluminum oxides $Al_2O_3$ and/or layered silicates. Preferably, provided in the molded body is at least one layer of porous concrete that has a CaO content of 7% to 10%. In this way, a sufficiently higher pH-value for the chemical precipitation of heavy metal ions is attained.

According to an embodiment of the invention, the filter element is part of a purification system, in which the filter is arranged as a partition between a lower and an upper compartment of a treatment chamber, wherein a water feed opens into the lower compartment and a water outlet issues from the upper compartment.

The filter action of the filter element, according to the invention, is determined by the size and the design of the pores, while the dissolved toxic substances are precipitated through adsorption, ion exchange, chemical precipitation and/or chelation through a high CaO portion in the cement. Here, it is important for the filter action based on adsorption, chemical precipitation and chelation, that the porous body has as large a surface as possible, relative to its volume. It is also advantageous when the molded body has a porosity that is increasingly fine in the flow-through direction, because then not all particles are filtered out in the same plane. The danger of a rapid silting up is thereby counteracted. If the filter element has a modular design, then individual filter parts that have become unserviceable can be replaced. Since the water to be purified in the purification system is forced to pass the filter element in the upward-flowing current, the solid particles are deposited on the filter element from below. This has the consequence that after the dying away of the vertical current, the filtered-out particles separate from the filter element and sink. For this reason, the lower compartment can preferably be formed as a sedimentation space. In order to separate out the solid particles as effectively as possible, a hydrocyclone baffle with sludge trap below it can be arranged in a sedimentation space. In order to activate the action of the hydrocylone, the water feed is made to flow into the lower compartment in a tangential manner.

The filter element made in accordance with the invention and the purification system according to the invention are especially suitable for removal of heavy metal ions such as Cu, Pb, Zn, Cd, and Ni from wastewater, in particular rainwater flowing down from metal roofs and transport surfaces.

For the water outlet from the treatment chamber, there are different possibilities. Thus, the water outlet can be formed by porous parts of the chamber wall. Alternatively or additionally, it can be formed using a discharge pipe. In this case, the pipe is preferably, but not necessarily, designed as a seepage pipe and embedded in a water-permeable filter material. According to the predictable water accumulation, several such pipes can also be connected to the upper section of the treatment chamber in a parallel-facing or star-shaped arrangement. In this way, an infiltration trench system, known in the art, may be formed for the seepage of the filtered water.

The pipe, like the filter element, may consist of porous concrete. It then acts as a second filter stage, which in like manner as the first filter stage of the filter element, can filter out toxic substances not collected by the first stage.

According to a further embodiment of the invention, the pipe leads to a control chamber. Here, the effectiveness of the one or several stage filtration can be controlled. This control chamber can also be used for the supplying of rinse water for the backrinsing of the filter element and, if necessary, the pipe. In order to prevent leaves and other refuse from reaching the treatment chamber with the filter element in the first place, a prefilter for leaves and other refuse can be arranged in the pipe leading to the water inlet into the chamber.

DESCRIPTION OF THE DRAWINGS

The foregoing features, objects and advantages of the invention will become apparent to those skilled in the art from the following detailed description of a preferred embodiment, especially when considered in conjunction with the accompanying drawings in which like numerals in the several views refer to corresponding parts.

FIG. 1 shows a purification system in a cross-sectional view; and

FIG. 2 shows a cross-sectional view of a seepage pipe of the purification system according to FIG. 1.

DESCRIPTION OF THE PREFERRED EMBODIMENT

Certain terminology will be used in the following description for convenience in reference only and will not be limiting. The words "upwardly", "downwardly", "rightwardly" and "leftwardly" will refer to directions in the drawings to which reference is made. The words "inwardly" and "outwardly" will refer to directions toward and away from, respectively, the geometric center of the device and associated parts thereof. Said terminology will include the words above specifically mentioned, derivatives thereof and words of similar import.

The purification system represented in FIG. 1 shows three generally vertical shafts arranged in the ground, which are connected to each other via pipes. A first shaft 1 serves as the prefilter for leaves and refuse. A second shaft 2 encloses the main elements of the purification system. A third shaft 3 serves as the control and rinsing shaft. The second shaft 2 may comprise a cylindrical tank adapted to be buried in the ground and is preferably formed from concrete, much like a manhole structure used in sewer systems. It is also contemplated that the shaft 2 may be fabricated from a suitable polymer. The shaft 2 includes a removable cover at the ground surface so that the cover can be readily removed to provide access to the interior thereof for maintenance and repair purposes.

The water to be purified enters, via a pipe 4, a chamber 5 of the shaft 1 and, in the case of a normal water accumulation, after passing through a sieve 6 for leaves and refuse reaches, via a pipe 7, a lower compartment 9 of a treatment chamber 8 of the shaft 2. The lower compartment 9 is separated from an upper compartment 11 of the treatment chamber 8 by a filter element 10 that has a modular design and is arranged as a generally horizontal partition. A water inlet 12 of the pipe 7 opens tangentially into the lower compartment 9, so that a swirling flow is generated. A 90 degree elbow attached to the end of the pipe 7 may be used to promote the desired circular flow pattern. Arranged approximately at the center of the lower compartment 9 is a funnel-shaped element 13 with a central opening 14, which element together with the tangential inlet 12 forms a cyclone filter. The swirling flow provides a greater dwell time for non-floatable solids passing through the sieve 6 to settle out. Via the central opening 12, solid matter precipitating in the lower compartment 9 can fall down into a sludge trap 15, from which it can be periodically suctioned by a maintenance worker via a disposal pipe 16. While the disposal pipe 16 is shown as running along side the filter element 10, it can also be designed to pass through the filter element.

The filter element 10 is constructed in a modular manner from one or more plates consisting of no-fines texture, porous concrete with a high portion of CaO component in the cement. The lower plates in a stack of such filter plates have a coarser porosity than the upper plates. Through this means, the smaller solid particles of the water to be purified, which flows through the filter element 10 in the upflow process, are not already retained at the underside of the filter element 10, but rather disperse in the deeper lying layers. The purified water that reaches the upper compartment 11 can flow off from there into a control and rinsing chamber 19 of the control and rinsing shaft 3, via water outlet 17 and a pipe 18. The pipe 18 is designed as a seepage pipe and displays the cross section shown in FIG. 2. Like the filter element 10, the pipe 18 consists of porous concrete, in particular with a pH-reactive floor 20. Due to this floor 20, the pH value of the water is increased to a value of 7 to 9. The pipe 18 of porous concrete is shown as being embedded in a so-called "infiltration trench", filling 21 consisting of a special filter material. This facilitates a large-surface distribution of the water to be drained away. It is to be understood that several such pipes 18 can be connected to both the upper compartment 111 of the molded element 2 and to the control and rinsing chamber 19. Where local laws or regulations forbid the use of infiltration trenches, the filtered rainwater runoff can flow out from chamber 11, via non-porous pipe into a municipality's stormwater sewer system.

In order to be able to receive an unexpectedly high volume and, if need be, to discharge it unpurified, an overflow pipe 22 is shown leading from the prefilter chamber 5 into the upper compartment 11 of the treatment chamber 8. In a corresponding manner, an overflow pipe 23 is connected to the control and rinsing chamber 19, in order to allow water that cannot seep to be discharged.

As FIG. 1 shows, the water outlet is arranged such that the filter element 10 always lies below the water line. Prevented through this means is a drying out of the filter element 10, and in particular, a caking in the filter element 10 of solid particles such as clays, etc., which would negatively influence the effectiveness of the filter element 10 and its service life and ability to be rinsed. Water can also be introduced, via the treatment chamber 8, in order to backrinse the filter element 10 from time to time. The particles loosened from the filter element 10 then sink into the sludge trap 15. In this way, material deposited in the pipe 18 can also be rinsed into the control and suction shaft.

In accordance with the present invention, the filter media 10 preferably comprises a porous or permeable concrete material made from gravel or stone, cement (or any other bonding agent such as a synthetic resin), water, but little or no sand, crushed quartz has been found to serve well as the aggregate. This mixture creates an open cell structure that allows stormwater to filter through the porous concrete layers. Depending on the blend, stone size and the thickness of the plates, the porous concrete filter media can pass three to five gallons of water per minute through its open cells for each square foot of surface area. As indicated, the pervious concrete may have a void structure of 20% to 25%, allowing water to readily pass through it at the rate indicated. The efficiency of removal of pollutants decreases with increasing pore size of the filter media. Where heavy metal concentrations in the stormwater are low, a higher flow rate can be achieved using filter plates having a larger pore size. With larger pore sizes and medium-to-high metal concentrations in the stormwater runoff, additives placed in the filter media may be used to achieve sufficient cleaning capacity to meet applicable standards. The lime naturally occurring in cement renders the filter material alkaline and reacts with certain pollutants, such as phosphates, to precipitate and/or adsorb dissolved contaminants so that they ultimately become entrapped in the filter media or settle out into the sedimentation trap 15 at the base of the shaft 2.

Hydrocarbons tend to become entrained in the pores of the filter media. It is a further feature of this invention that chemical additives be blended with the cement or resin used in forming the porous concrete to address selected target pollutants. For example, $Fe_2O_3$ in powder form having a particle size less than 1 micron may be added to cement prior to its being mixed with aggregate and water to form the porous concrete. The presence of the $Fe_2O_3$ has been found to enhance the ability of the filter plates to adsorb phosphors.

Iron oxides and hydroxides promote the chemical precipitation of heavy metals as insoluble metal hydroxides and phosphates as iron-phosphates. Also, they enhance the ability of the filter to adsorb pollutants. Other additives may include limestone expanded clay and recycled concrete.

In accordance with another feature of the invention, certain zeolites having an infinity to heavy metal ions can also be blended in with the crushed rock or stone and cement mixture so that the zeolite is embedded directly in the filter media. Alternatively, a layer of zeolite can be inserted in a space between adjacent plates of porous concrete filter media. Suitable zeolites may include clinoptilolite, phillipsite or mordenite.

As a further aspect of the invention, it is contemplated that a slow release bactericidal agent can be added to the concrete blend or added as an intermediate layer between filter plates to kill various target bacteria, such as *e. coli* resulting from fecal pollution.

In operation, stormwater runoff from roads, parking lots, building roofs, etc. flows into the shaft no. 1 where leaves, sticks, and other debris greater than the mesh size of the sieve 6 are caught for subsequent removal. Stormwater carrying particles of dirt and sand along with other dissolved pollutants flow through the pipe 7 and through diverter 12 into the lower compartment 9 so as to create a circulating flow promoting the settling out of nonfloatable debris into the sump 15. As the stormwater builds up in the lower chamber 9, it ultimately permeates through the porous concrete filter media 10 to reach the level of the outlet pipe 18. In passing through the filter, various pollutants are either trapped within the filter media or are precipitated out therefrom to end up in the sump or sludge trap 15.

Because the filter element 10 is constantly located under the static liquid level maintained in the vessel, it prevents drainage and resulting clogging of the filter by fine sediments. Also, the circulatory flow of water beneath the filter plates 10 provides a scrubbing action that tends to remove solid particles and oils from the undersurface of the filter media. The lifetime of the porous concrete filter material necessarily depends on the concentration of pollutants in the runoff water reaching shaft 2. On the average, the filter media need only be replaced about every two years. However, in many installations, much less frequent replacement is required.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself

What is claimed is:

1. An apparatus for a purification system for water with solid particles and dissolved substances, comprising:
    a molded porous concrete filter body of porous concrete arranged in the purification system through which a water stream flows; and
    the porosity of the molded porous concrete filter body becomes more finely porous where pores decrease in size in a flow direction in a continuous manner;
    wherein the molded porous concrete filter body has an average pore ratio of about 25% by volume.

2. An apparatus for a purification system for water with solid particles and dissolved substances, comprising:
    a molded porous concrete filter body of porous concrete arranged in the purification system through which a water stream flows; and
    the porosity of the molded porous concrete filter body becomes more finely porous where pores decrease in size in a flow direction in a continuous manner;
    wherein the concrete consists of 85% to 89% by volume aggregate and 11% to 15% by volume cement.

3. The apparatus for a purification system according to claim 2, wherein the aggregate has a grain size of 0.25 to 4 mm with a cubic rounded to round grain shape.

4. A stormwater filter, comprising:
    a first modular plate of porous concrete located within an underground purification system;
    a second modular plate of porous concrete stacked upon the first plate,
    the first and second modular plates being easily replaceable; and
    the porosity of the molded plates becomes more finely porous in that additional pores decrease in size in a flow direction in a continuous manner;
    wherein the first and second plates have an open cell structure allowing stormwater to filter through the first and second plate;
    wherein at least the first or second plates have between a 20 to 25% porosity.

* * * * *